Patented Apr. 10, 1951

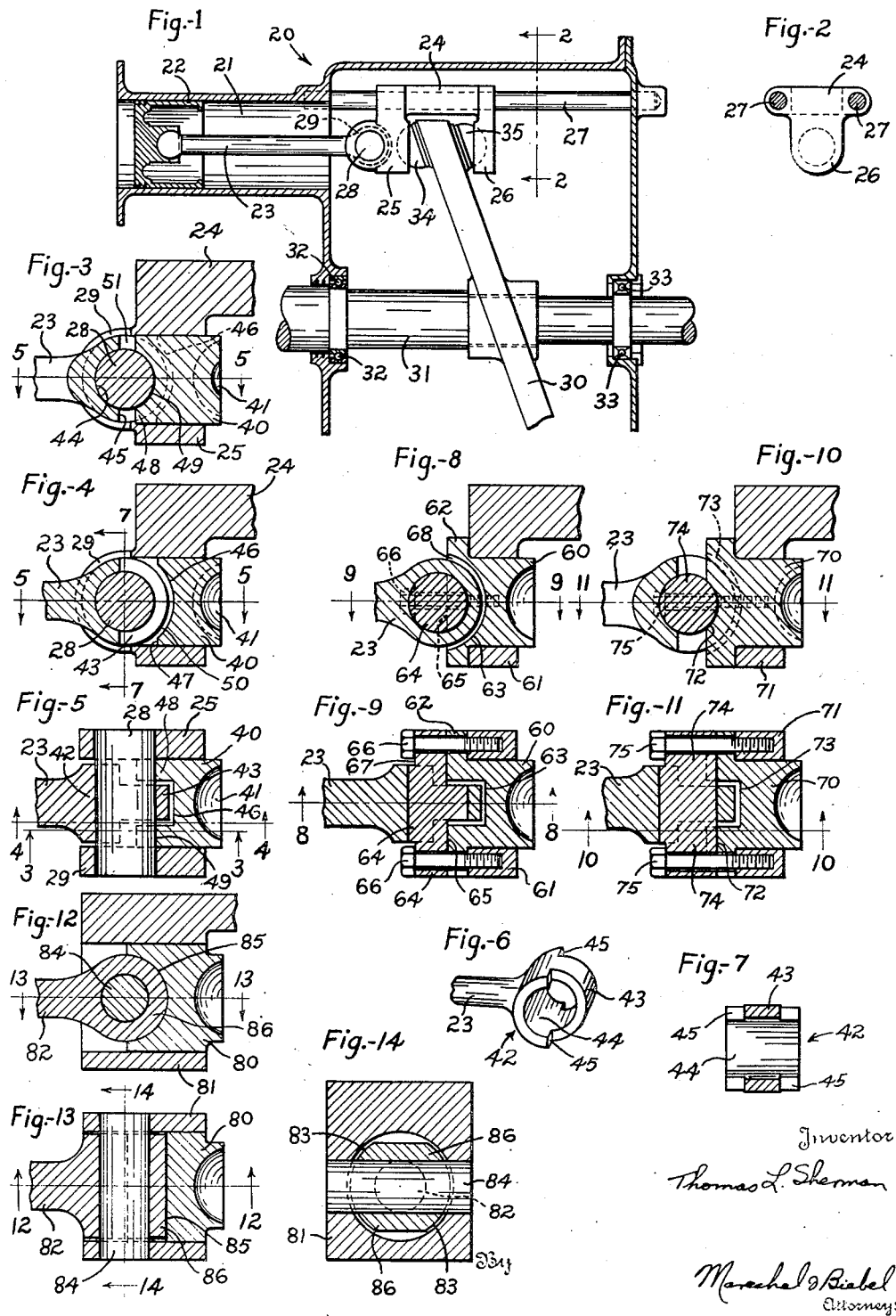

2,548,686

UNITED STATES PATENT OFFICE 2,548,686

CRANKLESS MECHANISM

Thomas L. Sherman, Springfield, Ohio, assignor to The Steel Products Engineering Company, Springfield, Ohio, a corporation of Ohio Application February 20, 1946, Serial No. 648,976

6 Claims. (Cl. 74—60)

This invention relates to crankless mechanisms wherein the reciprocating motion of pistons is translated into rotary motion of a shaft through a slant or swash plate secured to said shaft.

In one variety of this type of mechanism, for example an engine such as shown in Patent No. 2,178,972, issued November 7, 1939, the piston motion is transferred to the slant through bridge members which embrace the periphery of the slant and which are so mounted and guided in the engine as to limit their motion to a course parallel to that of the piston and hence parallel to the slant shaft. Each of the bridge members is in turn provided with a slipper bearing which engages the slant face and includes a spherically curved portion mounted for oscillatory movement in a complementary spherically curved socket in the bridge so as to follow the varying presentation of the faces of the slant as the latter rotates. Since as stated each bridge is guided to limit its course to a straight line, it is possible to utilize a simple and inexpensive pin connection between the piston rod and bridge in place of a ball and socket joint. However, in this type of structure preferred results in operation are obtained when there is a maximum of directness and rigidity in the transfer of load from the piston and piston rod to the socket for the bearing element engaging the inner face of the slant, and such directness of transfer has not heretofore been achieved through a pin connection. It is accordingly one of the principal objects of the present invention to provide a mechanism of the above type wherein the piston rod is connected to the bridge through a pin joint constructed for direct transfer of load to the spherically curved socket for the bearing element engaging the inner slant face involving only a minimum stress in the pin arising from bending moments thereon.

Another object is to provide such a mechanism wherein the pin joint between the piston rod and the bridge is constructed for transfer of load between the piston rod and bearing socket within the projected area of the widest portion of the piston rod end adjacent the socket.

It is also an object of the invention to provide a mechanism as outlined above, wherein the spherically curved socket for the slipper bearing engaging the inner slant face is in a member separate from that bridge but carried thereby.

A further object is to provide a mechanism of the above type wherein the pin pivotally connecting the piston rod and the bridge is positioned for direct compression between the socket member and the widest portion of the adjacent piston rod end.

Other objects will be apparent from the following description, the accompanying drawings and the appended claims.

In the drawings in which like characters of reference designate like parts throughout:

Fig. 1 is a view in vertical section of a portion of a crankless mechanism of the type with which the present invention is concerned;

Fig. 2 is a fragmentary section taken on the line 2—2 in Fig. 1;

Fig. 3 is an enlarged fragmentary section illustrating a connection between the piston rod and the bridge which embodies a preferred form of the invention and is applicable to the structure shown in Fig. 1, the view being taken on the line 3—3 in Fig. 5;

Fig. 4 is a view similar to Fig. 3 taken on the line 4—4 in Fig. 5;

Fig. 5 is a section taken on the line 5—5 in Fig. 3 and also in Fig. 4, with the connecting pin member shown in elevation;

Fig. 6 is a detail view in perspective showing an end of a piston rod suitable for use in the structures illustrated in Figs. 3-5 inclusive;

Fig. 7 is a detail view of the same piston rod end, the view being taken in section approximately on the line 7—7 in Fig. 4;

Fig. 8 is a view similar to Figs. 3 and 4 illustrating a modification of the invention and taken on the line 8—8 in Fig. 9;

Fig. 9 is a view similar to Fig. 5 taken on line 9—9 in Fig. 8;

Fig. 10 is similar to Fig. 8 and shows another modification of the invention, the view being taken on line 10—10 in Fig. 11;

Fig. 11 is a view similar to Fig. 9 taken on the line 11—11 in Fig. 10;

Fig. 12 is a sectional view taken on the line 12—12 in Fig. 13 and illustrates a still further modified form of the invention;

Fig. 13 is a section taken on line 13—13 in Fig. 12; and

Fig. 14 is a detail view of the piston rod shown in Figs. 12 and 13, the view being taken on the line 14—14 in Fig. 13.

Referring first to Figs. 1 and 2, the portion of the engine structure designated generally by the reference character 20 includes a cylinder 21 having a piston 22 reciprocable therein and connected through a piston rod 23 to a bridge member 24. This bridge member includes two arm portions 25 and 26 and is mounted for sliding movement on parallel guide rods 27 mounted in the engine frame. Since the bridge is thus limited to substantially straight line motion, parallel to the direction of reciprocation of piston 21, piston rod 23 may be connected thereto by a simple pivotal joint, shown as comprising a pin 28 engaging in suitably apertured ear portions 29 extending from bridge arm 25. Such a connection requires much less machining in manufacture than a ball and socket joint, such as is shown in the above Patent No. 2,178,972, and it is accordingly much less expensive to produce in quantity. Bridge arms 25 and 26 are spaced from each other and embrace the periphery of the slant member 30, which is shown as secured to shaft 31 mounted as by means of bearings 32 and 33 for rotation in the engine frame.

Each of the bridge arms 25 and 26 carries a slipper bearing element 34 and 35 adapted to engage the outer and inner faces, respectively, of slant 30. As the slant rotates, its faces are presented to these bearing elements at constantly changing angles, and the bearings are accordingly provided with spherically curved portions mounted for oscillatory movement in complementary spherically curved sockets in the adjacent faces of the bridge arms. When piston 22 reciprocates in the usual course of operation of an engine, its thrust on the working or power stroke will be transmitted through rod 23 to the bridge and thence through bearing 35 to the inner slant face, thus imparting the desired rotary motion to the slant and its shaft 31. Conversely, on the return stroke of the piston there will be similar transfer of load from the slant to the piston rod as the result of the rotation of the slant from the firing of other cylinders or from inertia of the reciprocating unit. Thus the joint between the piston rod and slipper bearing 35 is subjected to substantial compression on both strokes, and since the bearing oscillates constantly, there is a more or less continual load on the socket wherein its spherically curved portion is mounted. It has not been found practical to form the bridge of a material capable of supplying suitable bearing characteristics in this socket, particularly for engines and like structures which involve high piston loads. The present invention accordingly provides a member separate from the bridge but carried thereby wherein the bearing socket is formed, and provides also means for connecting the piston rod with the bridge so constructed that the load on the rod is transferred directly to this socket member, thus not only making possible the obtaining of the desired bearing characteristics in the socket but also providing for maximum contact surface areas in the transfer of load between the piston rod and socket.

Bridge arm 25 is illustrated in Figs. 3 to 5 as provided with an aperture therethrough parallel to piston rod 23 which receives a member 40 having formed at one end thereof a spherically curved socket 41 adapted to receive the spherically curved portion of slipper bearing 34. The end of piston rod 23 is formed into a generally cylindrical eye portion 42 provided with an axial bore transverse with respect to the length of the rod and adapted to receive the pivot pin 28. At each side of the rod this eye portion 42 is cut away generally perpendicular to the bore therein and parallel to the length of the rod to form a tongue portion 43 at the outer end of the piston rod, with the remaining wide portion 44 of the eye forming shoulder portions 45, which are approximately parallel to a plane passing through the center of eye 42 and perpendicular to the length of rod 23. This structure is shown most clearly in Figs. 6 and 7 and also in Fig. 5, and the function thereof will presently be described.

Socket member 40 is provided in its end opposite socket 41 with a generally cylindrical groove 46, the radius of which is slightly greater than the outer radius of the tongue portion 43 of the piston rod, and the width of which is sufficiently greater than the width of this tongue portion to permit the latter to lie freely within this groove 46. The opposite ends of groove 46 are shown in Fig. 4 as squared off at 47 for convenience of manufacture and to avoid sharp edges. This construction results in leaving in member 40 on each side of groove 46 projecting trunnion-like portion 48, each of which is bored out at 49 concentric with groove 46 and of radius or size substantially equal to that of connecting pin 28.

In the assembly of the parts formed as described, pin 28 is engaged in apertured ears 29 on the bridge arm and also in the bore in the end of the piston rod and thus provides a pivotal connection between the rod and bridge. When socket member 40 is inserted in the recess therefor in the bridge arm, its groove 46 receives the tongue portion 43 at the outer end of the piston rod, but its trunnion portions 48 extend on each side of tongue 43 further into the recess until the bottoms of the grooves 49 therein abut pin 28, this result being made possible by the cutting away of the portions of the piston rod end to form this tongue portion. Since groove 46 is initially formed with a radius greater than that of tongue 43, this abutting of the trunnion portions 48 against pin 28 maintains a spaced relation between this tongue portion and the bottom of the groove 46, the resulting clearance being indicated at 50 in Figs. 4 and 5. Similar clearance is provided at 51 between shoulders 45 on the piston rod and the outer ends of trunnions 48, thus permitting an appreciable degree of rotational movement of the piston rod about pin 28 without irregular contact with socket member 40.

When the above joint structure is incorporated in the engine mechanism shown in Figs. 1 and 2, in the operation of the engine, thrust on the piston rod will be transferred to connecting pin 28 and thence directly to socket member 40 through the abutting surfaces of the pin and trunnion portion 48 at 49, and from socket member 40 directly to the inner slant face through slipper bearing 35. This transfer of the thrust load will be in a substantially direct line, from left to right as viewed in the drawing through direct compression of pin 28 between the wide portion 44 of the piston rod eye and cylindrical surfaces 49 in the socket member, these surfaces abutting opposite sides of the pin as indicated at 44 and 49 in Fig. 3, and tongue portion 43 being held out of contact with socket member 40 at 50 as described. Thus the transfer of load will take place directly within the projected area of the widest portion of the piston rod end—i. e., within the projected area of portion 44 as viewed in Fig. 7 rather than indirectly by transfer outwardly to the ends of pin 28 and thence to the bridge. This reduces deflection of the pin to a minimum and avoids stress of the type likely to produce failure therein.

The reduction in width of the piston rod end to form tongue 43, as described, does not weaken the structure since the transfer of load between pin 28 and the rod is always greater on the side of the pin adjacent the piston than away from the piston, particularly in two-cycle engines where the inertia forces toward the piston which would tend to load tongue portion 43 are largely offset by the compression load on the piston. This factor is of importance in determining the extent to which the sides of the eye portion 42 are cut away to form tongue 43. Shoulder portions 45 should be spaced from the end of the rod sufficiently to provide clearance at 51 as described. Also, the surface 44 within eye 42 to the left, as viewed in the drawings, of the plane passing through the center of said bore perpendicular to the length of the piston rod, which corresponds to the section line 7—7 in Fig. 4, should be adequate to transmit the full thrust of the piston to pin 28 without undesirable stress thereon.

Figs. 8 and 9 show a modified form of connection wherein socket member 60, which otherwise corresponds to socket member 40 as described, extends completely through the aperture therefor in bridge arm 61, which corresponds to bridge arm 25 as described, and is provided at its end adjacent piston rod 23 with a peripheral flange 62 adapted to seat against the surface of bridge arm 61 adjacent the piston rod. Socket member 60 is provided with a groove 63 which corresponds to groove 46 in socket member 40 and is similarly formed with a radius slightly greater than the outer radius of eye portion 43 of the piston rod, but otherwise this surface of socket member 60 remains substantially flat. Pin member 64, which provides the pivotal connection between the piston rod and bridge is formed with substantially flattened surfaces 65 adjacent each end which are adapted to abut and seat on the face of socket member 60 and on each side axially of the groove 63 therein, the reference character 65 also indicating these abutting surfaces. A pair of bolt members 66, one adjacent each end of pin 64, serve to secure both the pin and socket member 60 to bridge arm 61, each pin passing through flange 62 on the socket member. The outer surface of pin 64 may be flattened as indicated at 67 to facilitate seating of the heads for bolts 66.

The operation of the construction shown in Figs. 8 and 9 is similar to that shown and described in connection with Figs. 3–5. The thrust load on piston rod 23 will be similarly transferred in a direct line to socket member 60 through direct compression of pin 64 between the wide portion 44 of eye portion 42 of the piston rod and the outer surface of socket member 60 at 65 with tongue portion 43 similarly held out of contact with groove 63 as shown at 68. The general explanation of these features of construction and operation in connection with Figs. 3–5 applies with substantially equal force to the construction shown in Figs. 8 and 9.

Figs. 10 and 11 show a form of connection similar to that shown in Figs. 8 and 9 but differing in that socket member 70 in bridge arm 71 is provided with part cylindrical grooves 72 on each side of its central groove 73 to receive the outer ends of pin member 74, which is similarly secured to the socket member and bridge arm by means of bolts 75. This connection is otherwise substantially the same in construction and operation as that described in connection with Figs. 8 and 9.

Figs. 12, 13 and 14 show a connection embodying a still further modified form of the invention wherein the transfer of load is directly from the outer end of the piston rod to the socket member. In this construction socket member 80 is carried as in the other forms in a suitable aperture, preferably circular, in bridge arm 81. Piston rod 82 differs from the piston rod structure shown in the other views of the drawings in that it does not have the tongue construction 43 at its outer end but instead is partially rounded as indicated at 83 in Fig. 14 in order to fit within the circular aperture in the bridge arm. Pin 84 provides a pivotal connection for the piston rod end within this aperture in bridge arm 81. Socket member 80 is provided in its surface opposite the socket therein with a groove 85 extending completely across said surface and shown as part-cylindrical with a radius substantially equal to the outer radius of piston rod 82 at the end of piston rod 82. With this construction, when the device is assembled socket member 80 will engage within the aperture therefor in bridge arm 81 until the outer end of piston rod 82 seats within groove 85 and in contact with the surface of said groove, as opposed to the clearance at this surface in the other illustrated constructions. In operation, thrust load on the piston rod will be transferred directly to the socket member through compression of both pin 84 and that portion 86 of the piston rod between pin 84 and socket member 80. This construction, therefore, will in operation have advantages of a high degree of directness and rigidity in the transfer of loading between the piston rod and the socket member while at the same time providing positive connection with the bridge member.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. A piston rod connection adapted for use in a crankless mechanism including a shaft, a slant member mounted on said shaft, a cylinder, a piston reciprocable in said cylinder substantially parallel to said shaft, a piston rod, a bridge member adapted for engagement with said slant, guide means for said bridge limiting the movement thereof to substantial parallelism with said shaft, and a bearing element between the inner side of said slant and said bridge, said connection comprising a member separate from said bridge and having therein a socket providing a pivotal mounting for said bearing element, means for supporting said member for movement with said bridge, means including a pin arranged transversely of said piston rod providing a pivotal connection between said piston rod and said bridge, and means on said piston rod and said socket member abutting said pin at substantially directly opposite points to effect compression of said pin between said rod and said socket member for substantially straight line transfer of thrust between said rod and said socket member with minimum deflection of said pin.

2. A piston rod connection adapted for use in a crankless mechanism including a shaft, a slant member mounted on said shaft, a cylinder, a piston reciprocable in said cylinder substantially parallel to said shaft, a piston rod, a bridge member adapted for engagement with said slant, guide means for said bridge limiting the movement thereof to substantial parallelism with said shaft, and a bearing element between the inner side of said slant and said bridge, said connection comprising a member separate from said bridge and having therein a socket providing a pivotal mounting for said bearing element, means for supporting said member for movement with said bridge, and means including a pin member providing a pivotal connection between said piston rod and said bridge, said socket member including a groove in its end opposite said socket, said piston rod including a tongue portion freely located in said groove, said tongue portion being narrower than the adjacent portion of said piston rod to leave a wider portion of said piston rod at the opposite side of said pin from said tongue portion, the portions of said socket member on either side of said groove engaging said pin and maintaining said piston rod tongue out of contact with the bottom of said groove to effect direct compression of said pin between said socket member and said piston rod within the projected area of said wider portion of said piston rod adjacent said socket member for transferring load therebetween.

3. A piston rod connection adapted for use in a crankless mechanism including a shaft, a slant member mounted on said shaft, a cylinder, a piston reciprocable in said cylinder substantially parallel to said shaft, a piston rod, a bridge member adapted for engagement with said slant, guide means for said bridge limiting the movement thereof to substantial parallelism with said shaft, and a bearing element between the inner side of said slant and said bridge, said connection comprising a member separate from said bridge and having therein a socket providing a pivotal mounting for said bearing element, means for supporting said member for movement with said bridge, the end of said piston rod adjacent said bridge comprising a cylindrical eye portion transverse with respect to said rod and having an axial bore, said eye portion being cut away parallel to said rod and perpendicular to the axis of said bore from the outer end of the rod to a plane perpendicular to said rod and spaced within a parallel plane passing through the center of said bore by a distance substantially less than the radius of said bore leaving a tongue portion at the outer end of said rod and eye portion thereof, said socket member having in the end thereof opposite the socket therein a part-cylindrical groove having a radius greater than the radius of said rod eye portion, said tongue portion freely locating in said groove, and a pin member engaging in said bore in said piston rod end and in complementary apertured lugs carried by said bridge to provide a pivotal connection between said rod and said bridge, the portions of said socket member on each side of said groove engaging said pin and providing for direct compression of said pin between said socket member and said piston rod within the projected area of the widest portion of said piston rod adjacent said socket member to transfer load therebetween.

4. A piston rod connection adapted for use in a crankless mechanism including a shaft, a slant member mounted on said shaft, a cylinder, a piston reciprocable in said cylinder substantially parallel to said shaft, a piston rod, a bridge member adapted for engagement with said slant, guide means for said bridge limiting the movement thereof to substantial parallelism with said shaft, and a bearing element between the inner side of said slant and said bridge, said connection comprising a member separate from said bridge and having therein a socket providing a pivotal mounting for said bearing element, means for supporting said member for movement with said bridge, the end of said piston rod adjacent said bridge comprising a cylindrical eye portion transverse with respect to said rod and having an axial bore, said eye portion being cut away parallel to said rod and perpendicular to the axis of said bore from the outer end of the rod to a plane perpendicular to said rod and spaced within a parallel plane passing through the center of said bore by a distance substantially less than the radius of said bore leaving a tongue portion at the outer end of said rod and eye portion thereof, said socket member having in the end thereof opposite the socket therein a part-cylindrical groove having a radius greater than the radius of said rod eye portion, said tongue portion freely locating in said groove, a pin member engaging in said bore in said piston rod end, and bolt means securing said pin to said socket member and said bridge to provide a pivotal connection between said rod and said bridge, the portions of said socket member on each side of said groove engaging said pin and providing for direct compression of said pin between said socket member and said piston rod within the projected area of the widest portion of said piston rod adjacent said socket member to transfer load therebetween.

5. In a crankless mechanism including a shaft, a slant member mounted on said shaft, a cylinder, a piston reciprocable in said cylinder substantially parallel to said shaft, a piston rod having an eye arranged transversely of the length thereof at the outer end thereof, a bridge member adapted for engagement with said slant, guide means for said bridge limiting the movement thereof to substantial parallelism with said shaft, and a bearing element between the inner side of said slant and said bridge, the combination of a member separate from said bridge and having therein a socket providing a pivotal mounting for said bearing element, a pin journaled in said piston rod eye, and bolt means securing said pin and said socket member to said bridge with said pin positioned for direct compression between said piston rod and said socket member to transfer load therebetween.

6. In a crankless engine including a piston having a piston rod, the combination of a member guided for substantially straight line movement in response to reciprocation of said piston, a thrust member supported by said guided member for receiving and transmitting thrust from said piston rod, means including a pin forming a pivotal connection between said piston rod and said guided member, and means on said piston rod and said thrust member abutting said pin at substantially directly opposite points to effect compression of said pin between said rod and said thrust member for substantially straight line transfer of thrust between said rod and said thrust member with minimum deflection of said pin.

THOMAS L. SHERMAN.

REFERENCES CITED

The following references are of record in the file of this patent:

UNITED STATES PATENTS

| Number | Name | Date |
| --- | --- | --- |
| 696,235 | Greenwood | Mar. 25, 1902 |
| 1,409,057 | Michell | Mar. 7, 1922 |
| 1,781,069 | Michell et al. | Nov. 11, 1930 |
| 2,014,702 | Sherman | Sept. 17, 1935 |
| 2,461,056 | Hess | Feb. 8, 1949 |